(12) United States Patent
Reuter et al.

(10) Patent No.: US 8,543,484 B2
(45) Date of Patent: Sep. 24, 2013

(54) UNIVERSAL INTERFACE TO A FINANCIAL TRADING SYSTEM

(75) Inventors: Dierk Reuter, New York, NY (US); Louis Menna, Rutherford, NJ (US)

(73) Assignee: Goldman Sachs & Co., New York, NY (US)

( * ) Notice: Subject to any disclaimer, the term of this patent is extended or adjusted under 35 U.S.C. 154(b) by 1414 days.

(21) Appl. No.: 10/135,326

(22) Filed: Apr. 30, 2002

(65) Prior Publication Data

US 2003/0126063 A1   Jul. 3, 2003

Related U.S. Application Data

(60) Provisional application No. 60/287,435, filed on Apr. 30, 2001.

(51) Int. Cl.
*G06Q 40/00* (2012.01)

(52) U.S. Cl.
USPC ............................................. 705/37; 705/35

(58) Field of Classification Search
USPC ............................... 705/35, 36, 37, 38, 39, 40
See application file for complete search history.

(56) References Cited

U.S. PATENT DOCUMENTS

| | | | | |
|---|---|---|---|---|
| 5,710,889 A * | 1/1998 | Clark et al. | | 235/379 |
| 5,787,402 A * | 7/1998 | Potter et al. | | 705/37 |
| 6,018,722 A | 1/2000 | Ray et al. | | 705/37 |
| 6,058,378 A | 5/2000 | Clark et al. | | 705/37 |
| 6,058,379 A | 5/2000 | Odom et al. | | 705/37 |
| 6,230,201 B1 * | 5/2001 | Guck et al. | | 709/228 |
| 6,347,307 B1 * | 2/2002 | Sandhu et al. | | 705/36 |
| 6,408,282 B1 * | 6/2002 | Buist | | 705/36 R |
| 2002/0023045 A1 * | 2/2002 | Feilbogen et al. | | 705/37 |
| 2003/0033239 A1 * | 2/2003 | Gilbert et al. | | 705/37 |
| 2003/0110113 A1 * | 6/2003 | Martin | | 705/36 |

OTHER PUBLICATIONS

Firms to Launch New Web Site for Foreign-Currency Trading—FXall.com to Provide Competing Quotations; Asian Wall Street Journal, Michael Sesit; (Victoria, Hong Kong) Jun. 8, 2000, p. 27; found at http://proquest.umi.com.*

Trio of Banks, Reuters Plan Venture to Enter Web-based Currency Trading; Wall Street Journal, Michael R. Sesit (Eastern Edition, New York, NY); Aug. 14, 2000, p. 1; found at http://proquest.umi.com.*

Rival ForEx Portals Ready to Open Although foreign exchange portals have been popping up all year, they won't compare with Fxall and secretive Atriax, sources say.; Bank Technology News, Tom Condon (New York), Nov. 2000, vol: 13, Issue 11, p. 1; found at http://proquest.umi.com.*

The Bank of New York, World's Largest Custodian Bank, Joins Fxall, Business Wire, Philip Weisberg (New York), Nov. 13, 2000; p. 1; found at http://proquest.umi.com.*

Rushing to the web: Foreign Exchange Trading on the Net; Financial Times, Geoff Nairn (London, UK) Feb. 7, 2001, p. 9; found at http://proquest.umi.com.*

* cited by examiner

*Primary Examiner* — Rajesh Khattar
(74) *Attorney, Agent, or Firm* — Perkins Coie LLP

(57) ABSTRACT

A method and system for providing remote access to trade functionality at a financial service provider is disclosed. A messaging protocol is provided which allows a party remote from the provider to price and enter into transactions with the provider. The messaging protocol is well suited for use in stateless communication networks, such as the Internet, and requires only minimal support functionality at the remote site to implement, thus making the system easy to use by a wide variety of types of remote systems.

20 Claims, 6 Drawing Sheets

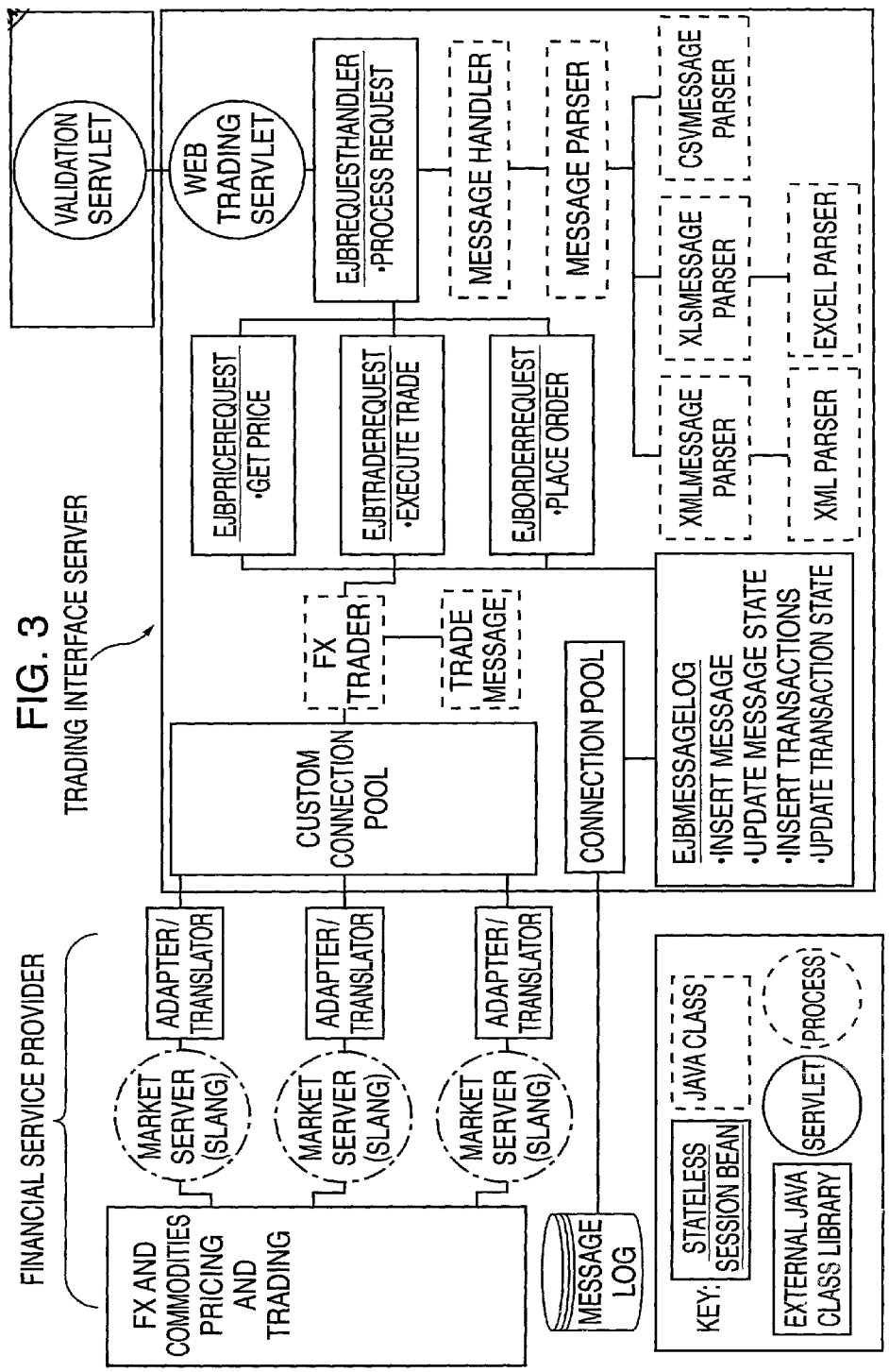

SUCCESSFUL TRANSACTION:

| STEP | INVESTOR | FINANCIAL SERVICE PROVIDER | DESCRIPTION |
|---|---|---|---|
| 1 | PRICEREQ -> | | INVESTOR REQUESTS A PRICE. |
| 2 | | <- PRICERES | SERVICE PROVIDER SENDS A PRICE BACK WITH A QUOTE ID. |
| 3 | TRADEREQ -> | | INVESTOR DEALS ON THE PRICE. THIS MESSAGE MUST INCLUDE THE QUOTEID SENT IN THE PRICEREQ MESSAGE. |
| 4 | | <- TRADERES | "TRADE IS DONE" MESSAGE SENT TO THE INVESTOR. |
| 5 | TRADEACK -> | | INVESTOR ACKNOWLEDGES THAT THE TRADE IS DONE. SERVICE PROVIDER ADDS THE POSITION TO THE BOOKS AND ISSUES AN ACKNOWLEDGEMENT RESPONSE. |

FIG. 4A

TRADE REQUEST REJECTED

| STEP | INVESTOR | TRANSACTION SERVICE PROVIDER | COMMENT |
|---|---|---|---|
| 1 | PRICEREQ -> | | YOUR INVESTOR REQUESTS A PRICE. |
| 2 | | <- PRICERES | SERVICE PROVIDER RETURNS A PRICE. |
| 3 | TRADEREQ -> | | INVESTOR DEALS ON THE PRICE. |
| 4 | | TRADERES | SERVICE PROVIDER REJECTS THE TRADE REQUEST. |
| | | <- TRANSACTIONSTATUS | REASON FOR REJECTION IS INDICATED IN THE REJECTED |
| | | TYPE=REJECTED | ELEMENT OF TRANSACTIONSTATUS. |

FIG. 4C

UNIVERSAL INTERFACE TO A FINANCIAL TRADING SYSTEM

CROSS-REFERENCE TO RELATED APPLICATION(S)

This application claims priority from U.S. Provisional Application Ser. No. 60/287,435 entitled "Electronic Access to Liquidity" and filed on Apr. 30, 2001, the entire contents of which is hereby expressly incorporated by reference.

FIELD OF THE INVENTION

The present invention is related to a network messaging protocol, method, and system which provides access to pricing and trading features of a financial services provider via a network.

BACKGROUND

Many institutional investors require the ability to perform transactions, such as currency exchanges, electronically. This "electronic liquidity" can be needed for several reasons. For example, electronic currency exchange services may be required to allow the institutional investor to provide goods and services on B2B or B2C marketplaces in multiple currencies. Other reasons include a desire by the institutional investor to integrate execution into risk management systems or in conducting "black box" trading.

Various mechanisms have been provided to allow an institutional investor to connect electronically to a financial service provider. However, conventional implementations require a substantial portion of the messaging infrastructure to be implemented on the institutional investor's system. In addition, the communications protocol between the institutional investor and the financial services provider is configured for use on a dedicated network and generally unsuitable for use on open network systems, such as the Internet, where communications are "stateless", making multiple step transactions more complex.

Accordingly, there is a need to provide an improved messaging framework which allows easy access by an institutional investor to financial services provided through a network, such as the Internet, and with only minimal processing required to be performed by the institutional investor.

SUMMARY OF THE INVENTION

These and other needs are addressed by the present invention which provides a simple, message-based framework that allows users to route price and trade requests to one or more servers connected between a network, such as the Internet, and thereby to the financial institution's host machines. The server can act as a liaison between an e-commerce application and the service provider's quote, execution, and confirmation systems. The framework is simple to implement and enables the client institution to use the power of the financial service provider's liquidity to enhance their existing software and functionality. By adding comparatively simple integration code to a system, the system can retrieve quotes, execute trades, and perform post-trade analysis.

A particular use of the present invention is to provide institutional investors with the ability to quickly engage in foreign exchange transactions with a suitable financial service provider. Additional transactions, such as the purchase or sale of financial instruments or products are also supported. The invention will be particularly described herein with respect to foreign exchange-related transactions. However, the principles disclosed are applicable to a variety of other financial transactions.

According to a particular implementation, a system for providing access to a financial service provider has an interface to a communications network and is also connected to appropriate portions of the financial service provider system, e.g., through appropriate data interfaces. The system is programmed to receive a price request message from an entity, obtain a price from the financial service provider and, upon receiving the price, format and transmit a price response message to the entity containing data identifying the transaction type, specifying the transaction details, indicating that the price request was accepted or rejected and, if accepted, specifying a puce for the transaction, and a transaction M. Upon receiving a trade request message containing the transaction ID, the server obtains approval to enter into the transaction from the financial service provider and transmits a trade response message to the entity which contains the transaction ID and indicates whether the trade request was approved or rejected. If the trade request was approved, the system waits until receiving a trade acknowledgement message from the entity before instructing the financial service provider to add the transaction to its books.

The invention can be embodied as computer executable program code residing on a computer-readable medium, a computer data signal embodied in a digital data stream, or a method of interacting with a network access device designed to assist a user incorporate the functionality of the present invention into their systems. Various features and embodiments are further described in the following figures, drawings and claims.

DESCRIPTION OF THE DRAWINGS

FIG. 3 is a high level diagram showing the architecture of a particular transaction system for Foreign Exchange which utilizes the present invention; and FIGS. 4a-4c illustrate message flow sequences for successful and unsuccessful pricing and transaction requests.

DETAILED DESCRIPTION OF THE PREFERRED EMBODIMENT(S)

Figure 1:
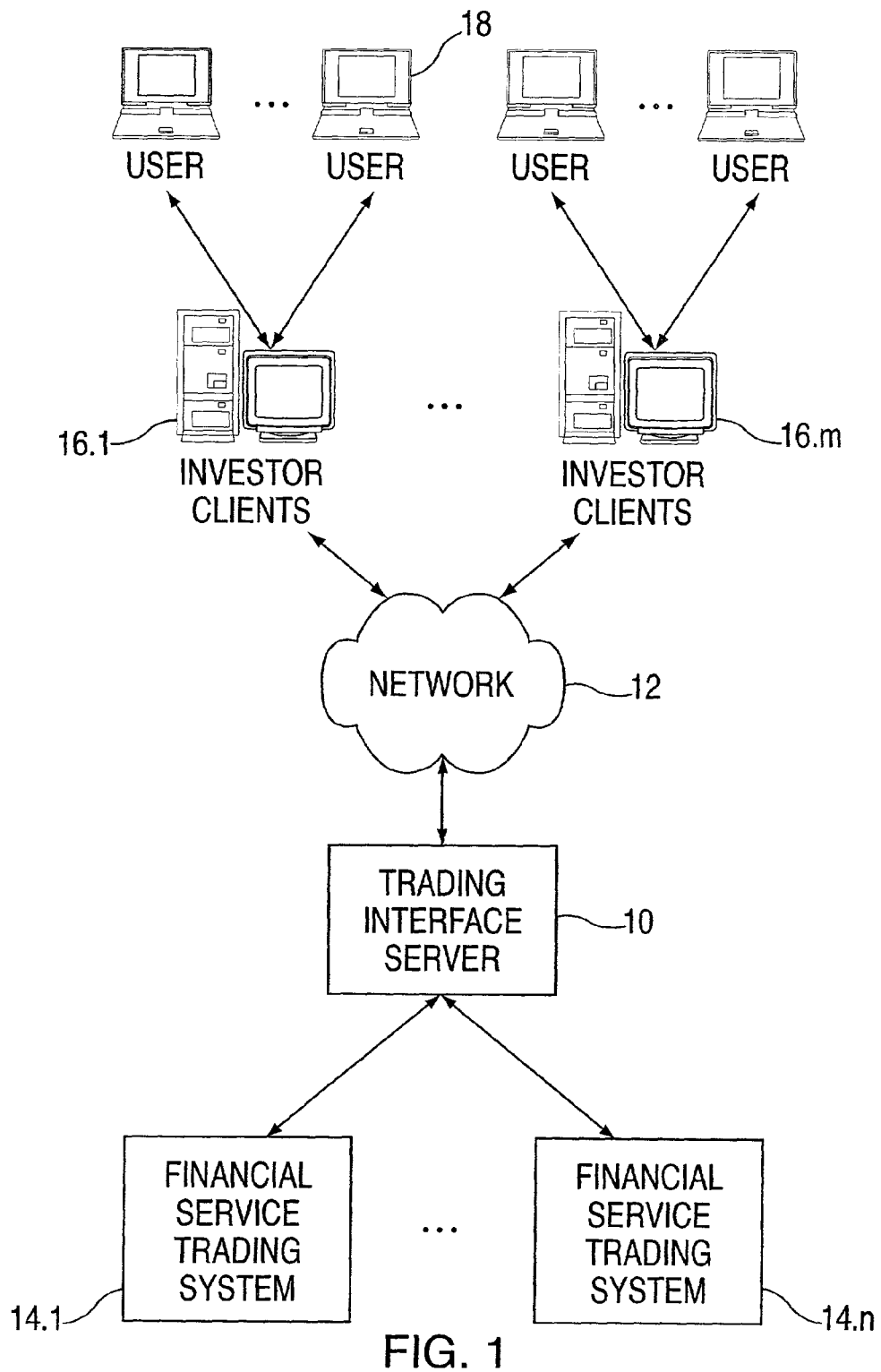
FIG. 1 is a block diagram showing an environment in which the present invention can be implemented.

Turning to FIG. 1, there is shown a block diagram of an environment in which the present invention can be implemented A trading interface server 10 is connected between a network 12, such as the Internet, and one or more financial service trading systems 14.1 . . . 14.n. The trading systems 14.1-14.n can be from different financial service providers or represent various different systems associated with the same provider. For example, one system 14.1 can be a foreign exchange trading system from a first service provider and have its own quote, execution, and confirmation sub-systems, and another trading system 14.2 (not shown) can be for the trading of U.S. securities and may be associated with the first service provider or perhaps a different service provider.

As discussed more fully below, the trading interface server 10 implements a communications protocol that provides investor clients 16.1-16.m with access to the financial trading systems via a network 12. Investor clients can be institutional investors or other entities that wish to access or provide their own users 18 with access to the financial services available by the trading systems 14.1-14.*n*. In a particular implementation, the trading interface server 10 processes and routes price and trade requests between the institutional investors 16 and the appropriate systems within the connected financial service trading system(s) 14. Access to the system by the clients 16 can be by various ways including the Internet, dedicated lines, virtual private networks, and/or other forms of secure, managed bandwidth. For messaging which requires guaranteed high-speed access and secure communications, such as real-time price streaming, dedicated lines, virtual private networks, or other secure connection methods are preferred.

Once an institutional investor or other system is connected to the trading interface server 10, it can begin sending messages to, e.g., quote and engage in multiple foreign exchange contracts, using the protocols described herein. In a particular implementation, the investor client (directly or on behalf of its own users) can request quotes and trades which include, spot, forward, swap, and option transactions. Other supported message requests include trade blotter and trade details requests, pre and post trade allocations, and indicative spot price requests for a list of currencies.

Figure 2:
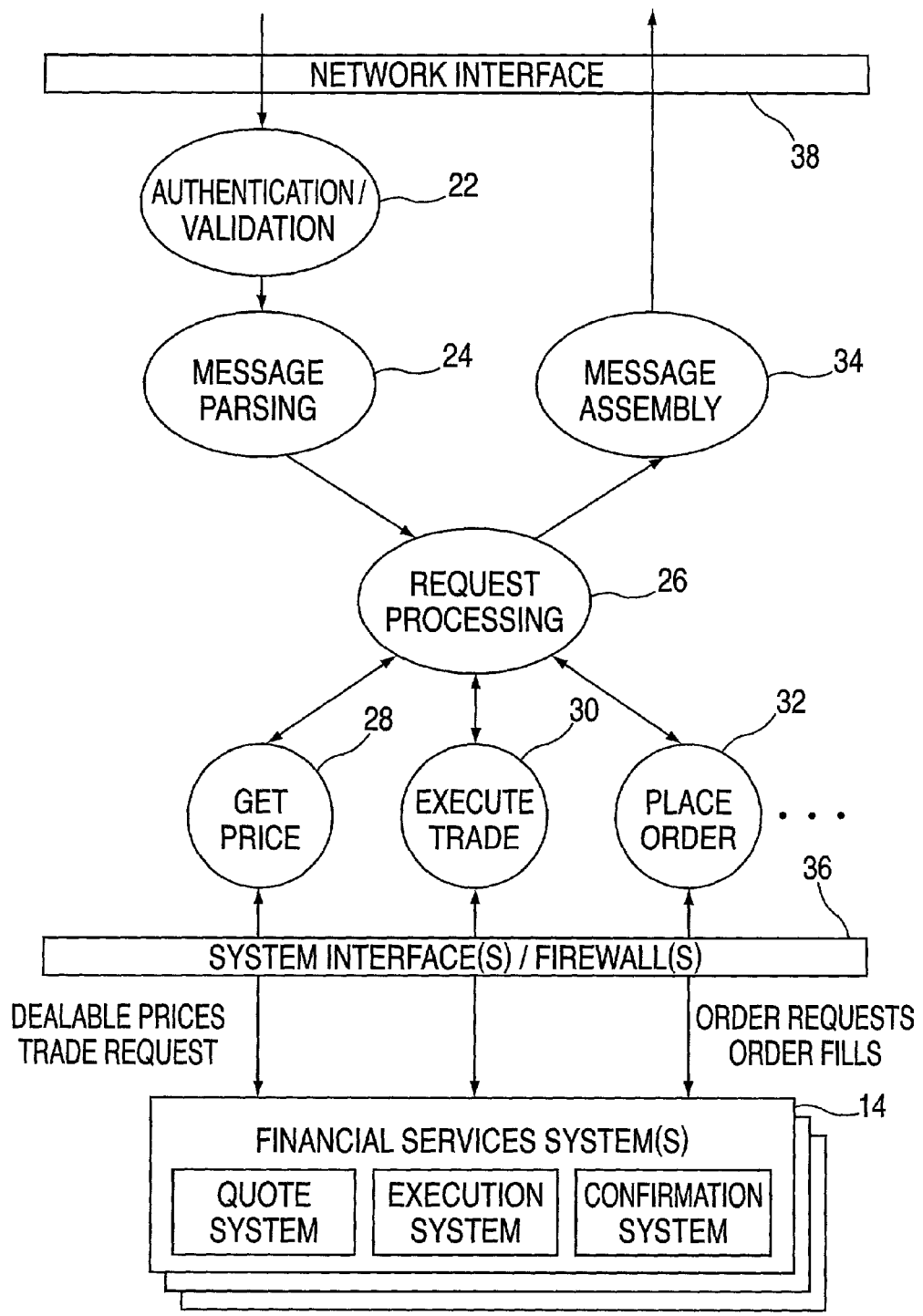
FIG. 2 is a high-level block diagram showing the major system components of the trading interface server of FIG. 1.

FIG. 2 is a high-level block diagram showing the major system components of the trading interface server 10 of FIG. 1. The server 10 is configured to process messages received from the network, interact with the financial services systems 14, and return messages to the clients. In a particular embodiment, the server 10 preferably comprises an authentication and validation module 22 which ensures that received messages are from authorized users and that the messages are in a correct format. A message parsing module 24 can be provided, if desired, to extract message data from the received data packet for processing.

A request processing module 26 is configured to examine a received message and determine an appropriate sub-module to process the request. Typically, each type of request will have an associated sub-module. Thus, for example, sub-modules 28, 30, and 32 can be provided to process get price, execute trade, and place order requests. Each sub-module contains functionality to pass data to the appropriate component in the financial services system and to receive a response. The request processing module 26 is further configured to receive responses from the sub-modules 28-32, and to assemble response messages for transmission to the client 16. Communication with the financial service system(s) 14 will typically be established via one or more interfaces and firewalls 36. Similarly, an appropriate interface 38 is provided to connect the trading interface server 10 with the network 12. The details of the interface are dependent on system implementation and appropriate interfaces and interface techniques will be known to those of skill in the art.

Figure 4B:
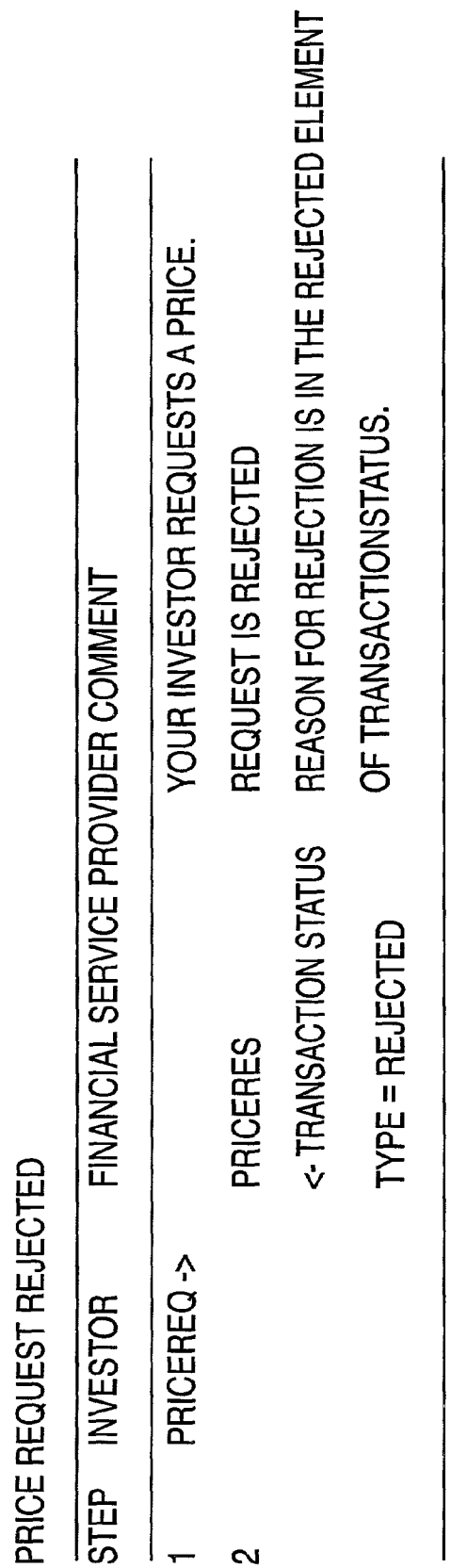

The message transaction flow can be represented by a list of transaction types, shown in the order they are sent and received between the financial institution and the investor. There are three typical transaction scenarios. In a first scenario, summarized in FIG. 4*a*, the transaction completes successfully. In a second scenario, summarized in FIG. 4*b*, a price request made by an investor is rejected, for example, because the user is not recognized, insufficient market data is available, etc. In a third scenario, summarized in FIG. 4*c*, a transaction is priced but a subsequent trade request is rejected, for example, because of credit restrictions, invalid QuoteID, etc.

A typical interaction using the protocol of the present invention could proceed as follows:

(1) the institutional investor requests a price to exchange a specified amount of one currency to another, (2) the trading interface server receives the price request, obtains a quote from the appropriate component in the financial service trading system, and returns a message to the client including the quote, (3) the client receives the quote and, if acceptable, returns a message requesting the trade, (4) the trade request is received by the trading interface server and processed and a "trade is done" message is returned to the client, (5) the client returns a message acknowledging receipt of the trade-done message, and (6) the transaction is recorded in the financial institution's books.

The sequence of communications will be discussed in more detail with reference to the transaction messaging protocol according to the invention. The messaging protocol is configured to minimize the amount of processing that must be performed by the remote site accessing the trading interface server 10. As a result, functionality to allow access to the trading interface server 10 can be easily added to the remote systems.

The protocol will be discussed herein with reference to examples in XML format. However, the protocol is not limited to only XML format implementations and other alternative formats can be used as appropriate for the communications medium and data format specifications. A most preferred data type definition for the messaging protocol, including required fields for this specific embodiment, as well as various optional fields is shown in Table 1, below. In the preferred embodiment, the XML requests are transmitted using generic WebService architecture and conventional HTTPS POST messages. Responses comprise a standard HTTP/1.1 header with the content type text/html and where the body of the response contains a reply message.

In the preferred XML format, all messages begin and end with a "Message" tag. Between the Message tags is the header and a body. The header contains identification information about the parties involved in the transaction and can also contain message-tracking identification codes. The header of the message can and preferably must contain a valid user name and password. When the server 10 receives a message, it automatically extracts the name and password from the header and uses them to authenticate the request. Various methods of encoding the name and password in the message and authentication techniques known to those of skill in the art can be used.

To allow the identification information to be separated from other information that may be present in the header, a separate NodeInfo tag can be used. A sample header for a message from an investor is shown below:

```
<Message type="Normal">
    <Header>
        <NodeInfo role="Requester">
            <EntityName>An Investor</EntityName>
            <Contact>Investor Contact</Contact>
```

-continued

```
        <User>investoruser</User>
        <HostAddress>http://www.aninvestor.com/cgi-bin/Processing.cgi</HostAddress>
        <MessageId>00001</MessageId>
    </NodeInfo>
    <SendDateTimeGMT>20020910 10:59:17</SendDateTimeGMT>
</Header>
<Body>
        body data
</Body>
</Message>
```

This header identifies the name of the investment institution or other entity, here "An Investor". The role of the entity can also be specified. In this example, the specified entity is in the role of the requestor of the transaction at issue. A time stamp field is also included. Further information can also be included in the header, such as a contact at the investor associated with the request, a client of the investor for whom the transaction is being requested (herein the "investoruser"), and a message ID specified by the investor. Additional fields, such as an HTTP address for a server associated with the entity can further be included for use as desired. In addition, a type field is preferably associated with the message tag to allow for administrative and diagnostic messages to be easily separated from normal messages. In the example above, the message type is "normal."

The body of the message contains financial details of the one or more transactions for which prices are being requested. A type attribute is used to specify the type of transaction being requested and a product detail tag is used to specify the product that is the subject of the transaction and to provide product-specific transaction details. In the preferred implementation, five transaction types are defined: PriceReq (a price request), PriceRes (a price response), TradeReq (a trade request), TradeRes (a trade response), and TradeAck (a trade acknowledgment). For foreign exchange transactions, typical transaction products include spot, forward, swap, and option. The transaction and product types can be used by the trading interface server 10 to determine how the message should be processed and, in particular, to which sub-module the request should be routed and which aspects of the financial services provider's system must be accessed in order to process the request. Preferably, multiple pricing requests and responses can be provided in a single message and can be grouped together under a TransactionList tag while messages containing only trade requests, responses, and acknowledgements are related to a single transaction.

When initiating a transaction, such as a foreign exchange transaction, the first step is to send a price request to the trading interface server specifying the product type of transaction to price and the details about the transaction itself. As will be appreciated, the transaction details are dependent on the type of transaction at issue. While particular transaction types are illustrated below, these are exemplary and those of skill in the art will appreciate how to extend the disclosed concepts to additional transaction types.

Preferably, the transaction details are specified between "ProductDetails" tags. For a Forward transaction, the transaction details contain two Commodity Quantity elements; one, QuantityCcy, specifies the quantity of currency to be sold and the currency type, the buyer and seller, and a second commodity element, OtherCcy, is used to specify the type of currency to get in exchange. The buyer and seller can also be specified here for consistency.

In a preferred embodiment, the transaction details can be specified in accordance with the template shown below:

```
<CommodQuantity type="QuantityCcy">
    <Commodity>CCY1</Commodity>
    <Quantity>#####.##</Quantity>
    <Buyer>Service-Provider</Buyer>
    <Seller>An Investor</Seller>
</CommodQuantity>
<CommodQuantity type="OtherCcy">
    <Commodity>CCY2</Commodity>
    <Buyer>An Investor</Buyer>
    <Seller>Service-Provider</Seller>
</CommodQuantity>
<Date type="SettleDate">YYYYMMDD</Date>
```

QuantityCcy and OtherCcy are currency types and are preferably specified using three-letter ISO currency codes. For an initial price request for this type of transaction, the associated quantity for QuantityCcy should be specified while the quantity for OtherCcy should be left blank and will be filled in by the financial service provider based on the exchange rate. The price request message must include consistent Buyer and Seller elements for both sides of the transaction (although conceivably, the transaction could be structured to involve more than two parties and the protocol extended accordingly).

The settlement date can be specified in year-month-day format, such as shown above. Alternative date formats in the price request are preferably also supported, such as "TOM" (tomorrow), spot, 1w, 1m, 2m, 3m, 6m, 9m, and 1y. However, preferably, when dates are specified in response messages sent from the financial service provider, the dates are indicated only in the YYYY-MM-DD format.

A sample message body for a foreign exchange forward price request is shown below:

```
<Body>
    <TransactionList type="PriceReq">
        <Transaction action="New">
            <ClientTransId>54321</ClientTransId>
            <ProductDetail type="FXForward">
                <FXForward>
                    <CommodQuantity type="QuantityCcy">
                        <Commodity>USD</Commodity>
                        <Quantity>1000000.00</Quantity>
                        <Buyer>Service Provider</Buyer>
                        <Seller>An Investor</Seller>
                    </CommodQuantity>
                    <CommodQuantity type="OtherCcy">
                        <Commodity>EUR</Commodity>
                        <Buyer>An Investor</Buyer>
                        <Seller>Service Provider </Seller>
                    </CommodQuantity>
                    <Date type="SettleDate">20020915</Date>
                </FXForward>
```

```
    </ProductDetail>
  </Transaction>
 </TransactionList>
</Body>
```

The transaction details are specified between start and end transaction tags. In this example, the institution is making a price request for a foreign exchange forward contract to exchange 1 million U.S. dollars for a quantity of Euros, dependent on the exchange rate, and where the transaction will settle on Sep. 15, 2002.

Additional fields can also be included in the message body. For example, a client transaction ID can be specified. This value, which can be freely defined by the requester (e.g., the institutional investor) will be copied into a reply message generated by the trading interface server so that the requester can match requests to replies. In addition, a TransactionAction field can be specified to indicate, for example, whether the transaction request is for a new transaction or the message is asking to update a prior transaction request. Further values, such as canceling a transaction request, "admin", for administrative messages, ignore, for system testing purposes, can also preferably be specified in the transaction-action field. If multiple price requests are desired, they can be included in the message as separate transaction elements between the transaction list tags.

As will be appreciated by those of skill in the art, the principles illustrated with respect to a forward price foreign exchange can be applied to any type of trade. Other preferred tags that may be suitable for use in these messages are shown in the data type definition shown in Table 1, below.

After receiving a price request, the trading interface server 10 validates and authenticates the message and parses the message as necessary. Based on the price request message type, the request processing module 26 passes at least the relevant message data, and preferably the entire message, to the get price module 28. This module is in communication with the appropriate functions in the financial service system for pricing foreign exchange price requests and passes it the details of the transaction. The get price module 28 receives from the financial service system 14 the price the service provider is willing to pay, here in the form of an exchange rate and a corresponding amount of currency. This value is then assembled in a message to be returned to the institutional investor making the request.

According to the protocols specified in a preferred embodiment of the invention, the TransactionList type in this response message is set to indicate a price response and the body of the message is updated to add the pricing information. In addition, a QuoteID value is specified by the financial service provider. This field indicates that the stated price is "dealable". The QuoteID is used in subsequent messages requesting a trade on the specified quote.

A quote expiration field may also be provided to indicate a period of time during which the quote will remain valid. If a client tries to deal on a quote that has expired, the transaction will be rejected. The timeout period can vary depending on market conditions and thus the quote expiration time may vary from one quote to the next. Preferably, Quote Expiration is set to 6 seconds by default.

Also, in some instances, the service provider may be unable or unwilling to specify a price. For example, the proposed transaction may exceed specified trading limits. To allow for this situation, a transaction status tag is provided which can be given a value to indicate whether the price request has been accepted or rejected. Additional details can also be added to the message as desired, such as a message under the transaction status tag giving details about the accepted transaction or an explanation of why a request was rejected.

A sample response message to the forward price request is shown below with the added fields shown in bold for reference:

```
<Message type="Normal">
    <Header>
        <NodeInfo role="Requester">
            ... requestor data ...
        </NodeInfo>
        <NodeInfo role="Responder">
            <EntityName>Service Provider</EntityName>
            <Contact>provider contact</Contact>
            <User></User>
            <HostAddress></HostAddress>
        </NodeInfo>
        <SendDateTimeGMT>20020910 11:58:16</SendDateTimeGMT>
    </Header>
    <Body>
        <TransactionList type="PriceRes">
            <Transaction action="New">
                <TransactionStatus type="Accepted">
                    <Accepted>I sell 1,000,000.00 USD and buy EUR at 0.906100 for value 22Jan02</Accepted>
                </TransactionStatus>
                <TransId type="QuoteId">D5379159z2</TransId>
                <QuoteExpiration>30</QuoteExpiration>
                <ClientTransId>54321</ClientTransId>
                <ProductDetail type="FXForward">
                    <FXForward>
                        <CommodQuantity type="QuantityCcy">
                            <Commodity>USD</Commodity>
                            <Quantity>1000000.0</Quantity>
                            <Buyer>Service Provider</Buyer>
                            <Seller>An Investor</Seller>
                        </CommodQuantity>
                        <CommodQuantity type="OtherCcy">
```

```
                <Commodity>EUR</Commodity>
                <Quantity>1103630.9458117206</Quantity>
                <Buyer>An Investor </Buyer>
                <Seller>Service Provider </Seller>
            </CommodQuantity>
            <Rate type="ExchangeRate">
                <Cross>USD/EUR</Cross>
                <Value>0.9061</Value>
            </Rate>
            <Rate type="ReferenceRate">
                <Cross>USD/EUR</Cross>
                <Value>0.9089</Value>
                <Points>-0.0028</Points>
            </Rate>
            <Date type="SettleDate">20020915</Date>
        </FXForward>
      </ProductDetail>
    </Transaction>
   </TransactionList>
  </Body>
</Message>
```

In this example, the transaction status type is "accepted", indicating that the financial service provider can set a price for the transaction. The "price" of the foreign exchange forward transaction is indicated in the "OtherCcy" section as the quantity of currency that the financial service provider is willing to pay for the offered currency. The message indicates that the price quote is valid for 30 seconds. Additional transaction information data can be provided, such as express statements of the exchange rate applied, data indicating the reference rate and points applied to the transaction, and a text summary of the transaction being priced. Although not required, preferably all of the transaction information is provided in the message so that the requesting party does not need to implement functions to look up this data when processing a returned message.

If the transaction cannot be priced, a price response message is returned indicating that the request was "rejected". A message giving grounds for the rejection can also be included. A portion of a sample price response message rejecting a price request is shown below:

```
<TransactionList type="PriceRes">
    <TransactionStatus type="Rejected">
        <Rejected>Quote Failed: Settlement Date is a USD Holiday:
        1 Jan02
        </Rejected>
    </TransactionStatus>
    <ClientTransId>54321</ClientTransId>
</TransactionList>
```

Once the institutional investor (or other requesting party) receives an accepted price response, it can request a trade for that transaction by sending a trade request message that contains an indication that the message is a trade request, e.g., by specifying this in the transaction list type field, and further contains the quote ID provided in the price response. Other fields, such as the transaction ID specified by the investor can also be included. In the preferred implementation, and unlike price request messages that can contain price requests for multiple transactions, trade requests can only contain one transaction. An example trade request message is shown below:

```
<Message type="Normal">
    <Header>
        ... header info ...
    </Header>
    <Body>
        <TransactionList type="TradeReq">
            <Transaction action="New">
                <TransId type="QuoteId">D5379159z2</TransId>
                <ClientTransId>54321</ClientTransId>
            </Transaction>
        </TransactionList>
    </Body>
</Message>
```

When a trade request message is received by the trading interface server, it passes the message to the appropriate submodule which informs the financial service provider of the trade request and provides the associated details as appropriate. The financial service provider processes the trade request and indicates whether or not it is willing to enter into the requested transaction. The trading interface server assembles and sends a trade response message that includes a Transactionstatus element with a type equal to Accepted or Rejected. If accepted, the message also includes the quote ID. If the trade was rejected, a text message can be provided to explain the nature of the failure, such as in the price request rejection shown above. A text message summarizing the transaction, as well as other details, can also be included in an accepted request. A sample trade response message in which the trade request was accepted is shown below:

```
<Message type="Normal">
    <Header>
        ... header info ...
    </Header>
    <Body>
        <TransactionList type="TradeRes">
            <Transaction action="New">
```

```
            <TransactionStatus type="Accepted">
                <Accepted>I sold 1,000,000.00 USD and bought 1,103,630.95 EUR for value
22Jan02</Accepted>
            </TransactionStatus>
            <TransId type="QuoteId">D5379159z2</TransId>
            <QuoteExpiration>6</QuoteExpiration>
            <ClientTransId>54321</ClientTransId>
        </Transaction>
    </TransactionList>
    </Body>
</Message>
```

At this point in the message stream, there has been an offer by the institutional investor and an acceptance by the financial service provider. However, according to an aspect of the invention, the transaction is not officially put on the service provider's books until after receipt of a trade acknowledgement message containing at least the quote ID. This message indicates that the accepted trade response message has been received by the investor. A sample acknowledgement message is shown below:

```
<Message>
    <Header>
        ... header info ...
    </Header>
    <Body>
        <TransactionList type="TradeAck">
            <Transaction action="New">
                <TransId type ="QuoteId">D5379159z2</TransId>
                <ClientTransId>54321</ClientTransId>
            </Transaction>
        </TransactionList>
    </Body>
</Message>
```

Once the trading interface server receives a trade acknowledgement message, it informs the financial service provider and the transaction corresponding to the include quote ID is added to the financial service provider's books.

If an acknowledgement to an accepted trade response is not received by the trading interface server within a specified period of time, such as 30 seconds, an error condition can be signaled indicating that the requestor should be contacted manually, such as by telephone, e-mail, or other means. Preferably, the contact data provided in the message header is used as an indication of the contact to discuss the transaction at issue.

Finally, the user can acknowledge the receipt of the trade response message. This involves sending a message in which QuoteID is used as a key to tie the separate parts of the transaction together. A sample trade acknowledgement response is shown below:

```
<Message type="Normal">
    <Header>
        ... header data ...
    </Header>
    <Body>
        <TransactionList type="TradeAckRes">
            <Transaction action="New">
                <GSTransId type="QuoteId">D5379159z2</GSTransId>
                <ClientTransId>54321</ClientTransId>
            </Transaction>
        </TransactionList>
    </Body>
</Message>
```

As will be appreciated by those of skill in the art, the messaging format and methodology disclosed above provides a flexible infrastructure which is easy to implement with minimal functional support required at remote site. The protocol is well suited for stateless communication networks, such as the Internet, since the trade pricing and traction requests follow a predefined sequence and messages related to the same transaction are related to each other by the QuoteID assigned by the financial entity (and the requestor's assigned transaction ID).

In addition, the operation of the trading interface server is relatively independent of the operation of the financial services system to which it provides access since (the generally pre-existing) automated functions in the financial services system are used to determine whether a price will be given or a transaction entered into. The trading interface server need merely be provided with appropriate sub-modules, such as the get price, execute trade, and place order sub-modules 28, 30, 32 shown in FIG. 2, that are in communication with the appropriate functions in the financial service system and can pass it data from received messages and can return data to be included in a reply message generated by the trading interface server. To support additional transaction types, additional sub-modules can be easily added. Although the system is shown with the various functions divided into particular modules and sub-modules, the dividing line between various functions is somewhat arbitrary and different functional configurations for the server can be used.

Further, and as mentioned above, different types of transactions can be easily accommodated by defining the transaction details for each transaction type. In a particular implementation, in addition to the foreign exchange forward transaction discussed above, spot, swap and option dealable price and trade requests are supported. The basic format of messages for these transactions is similar to that shown above. However, the transaction details are product-specific.

For example, in response to a price request for a product identified as a "spot", the response message includes settlement spot dates as determined by the financial service provider, for example, with reference to relevant holiday schedules. In the preferred embodiment, the spot data is indicated in the message body as <Date type="SettleDate">YYYYMMDD</Date>, where YYYYMMDD is the appropriate spot date for the listed currencies.

Swap price requests contain both near and far legs, each of which looks very much like a spot or forward. Like a forward request, a price response message to a swap price request contains settlement date and exchange rate elements such as described above. In addition, swap price responses include reference information, such as reference spot rates and point spreads. These pieces of data are included in the far leg of a given swap. A preferred message format for this data is shown below:

```
<Rate type="ReferenceRate">
    <Cross>JPY/USD</Cross>
    <Value>117.47</Value>
    <Points>-0.584</Points>
</Rate>
```

In this example, the Value element contains the reference spot rate. Unlike a forward, however, swap price responses use the Points element to show the point spread between the near and far legs. In a preferred implementation of the messaging protocol for swap requests, the near leg of a swap must appear first in the XML price request. In addition, to create a spot forward price request, specify Spot as the product type for the near leg and forward as the product type of the far leg. Similarly, prices provided for foreign exchange swaps include the point spreads between the near and far legs.

According to a further aspect of the invention, the messaging protocol can be extended to access post trade processing data and related functionality that may be provided by the financial service provider. In a particular embodiment, the trading server interface is configured to process requests to retrieve from the financial service provider data related to past transactions that were electronically booked, access the details of each of these trades and to account allocations (both pre and post trade).

In various circumstances, an institutional investor (or other party) makes a trade that should be allocated into multiple accounts at the financial service provider. The present methodology allows this to be done in an automated manner either at the time the trade is entered (pre trade) or after the trade was entered electronically (post trade)

A pre trade allocation message is similar to the trade request message discussed above. Once a valid price and its associated quote ID have been received, addition information can be included in the trade request to specify a desired sub-account break down. A sample message of this type in a preferred syntax is shown below:

```
<Message type="Normal">
    <Header>
        ... header data ...
    </Header>
    <Body>
        <TransactionList type="TradeReq">
            <Transaction action="New">
                <TransId type="QuoteId">D517200</TransId>
                <alloc:DealAllocations>
                    <alloc:Component>
                        <alloc:leg>
                            <alloc:Details acctStyle="STANDARD">
                                <alloc:acctName>Account 10170</alloc:acctName>
                                <alloc:acctLongName>The Account Name 10170</alloc:acctLongName>
                                <ccy1>EUR</ccy1>
                                <alloc:dealtAmount>500000</alloc:dealtAmount>
                                <alloc:settleInstructions>
                                    <alloc:type>1</alloc:type>
                                    <alloc:instructiondetail>SWIFT 1</alloc:instructiondetail>
                                </alloc:settleInstructions>
                            </alloc:Details>
                            <alloc:Details acctStyle="STANDARD">
                                <alloc:acctName>Account 25814</alloc:acctName>
                                <alloc:acctLongName>The Account Name 25814</alloc:acctLongName>
                                <ccy1>EUR</gsfxs:ccy1>
                                <alloc:dealtAmount>500000</alloc:dealtAmount>
                                <alloc:settleInstructions>
                                    <alloc:type>1</alloc:type>
                                    <alloc:instructiondetail>SWIFT 2</alloc:instructiondetail>
                                </alloc:settleInstructions>
                            </alloc:Details>
                        </alloc:leg>
                    </alloc:Component>
                </alloc:DealAllocations>
                <ClientTransId/>
            </Transaction>
        </TransactionList>
    </Body>
</Message>
```

For post trade allocation the message is similar, except the type="TradeReq" is replaced with type='AllocReq". Use if the different type is important to ensure that post trade allocations do not accidentally book a new trade but instead add allocation information to an existing trade.

In addition to making requests for dealable prices, the protocol according to the present invention can be expanded to support requests for indicative quotes, for example, for one or more currency crosses (e.g., USD/EUR or JPY/CHF). Typically, a requestor will not be able to trade on indicative rates but the request throughput will be much higher than for dealable quotes because only minimal processing by the financial services provider is required to service the request. When a continual series of indicative price requests are issued, the data flow is similar to a price data stream.

In a particular embodiment, the request message is configured with the TransactionList element's type attribute set to RateReq (rate request). The message further includes a RateList element with a type that specifies the rate info being requested, such as ExchangeRate and a mode attribute set to an appropriate time, such as Eod (end-of-day) or Realtime.

Setting the ExchangeRate element's mode attribute to Eod indicates that you would like the most recent end-of-day rate.

For a foreign exchange transaction, Rate and Cross elements for the different currencies of interest are placed between the opening and closing RateList elements. In the response message, the rate values are added to the message. Below is a sample portion of an XML message showing the body section of an Eod rate request that requests the exchange rate for four different currency exchanges:

```
<Body>
    <TransactionList type="RateReq">
        <Transaction action="New">
            <ClientTransId>00001</ClientTransId>
            <RateList type="ExchangeRate" mode="Eod">
                <Rate> <Cross>USD/EUR</Cross></Rate>
                <Rate> <Cross>USD/JPY</Cross> </Rate>
                <Rate> <Cross>EUR/JPY</Cross> </Rate>
                <Rate> <Cross>GBP/USD</Cross> </Rate>
            </RateList>
        </Transaction>
    </TransactionList>
</Body>
```

A sample response message is shown below in which a "value" tag has been added to each specified cross:

```
<Body>
    <TransactionList type="RateRes">
        <Transaction action="New">
            <TransactionStatus type="Accepted">
                <Accepted></Accepted>
            </TransactionStatus>
            <ClientTransId>00001</ClientTransId>
            <RateList type="ExchangeRate" mode="Eod">
                <Rate> <Cross>USD/EUR</Cross><Value>1.1723329425556859</Value> </Rate>
                <Rate> <Cross>USD/JPY</Cross> <Value>122.19999999472097</Value> </Rate>
                <Rate> <Cross>EUR/JPY</Cross> <Value>104.2366000005411</Value> </Rate>
                <Rate> <Cross>GBP/USD</Cross> <Value>1.3724999999998593</Value> </Rate>
            </RateList>
        </Transaction>
    </TransactionList>
</Body>
```

In some instances, the returned rates can contain multiple values. For example, in a realtime rate request, the rate can be returned as the most recent bid and ask values, such as shown in the sample message body shown below:

```
<Body>
    <TransactionList type="RateRes">
        <Transaction action="New">
            <TransactionStatus type="Accepted">
                <Accepted></Accepted>
            </TransactionStatus>
            <ClientTransId>00001</ClientTransId>
            <RateList type="ExchangeRate" mode="Realtime">
                <Rate> <Cross>EUR/USD</Cross> <Value side="Bid">0.8519</Value>
                    <Value side="Ask">0.8521</Value> </Rate>
                <Rate> <Cross>USD/JPY</Cross> <Value side="Bid">121.69</Value>
                    <Value side="Ask">121.73</Value> </Rate>
                <Rate>
                    <Cross>EUR/JPY</Cross> <Value side="Bid">103.67</Value>
                    <Value side="Ask">103.71</Value> </Rate>
                <Rate> <Cross>GBP/USD</Cross> <Value side="Bid">1.3889</Value>
                    <Value side="Ask">1.3894</Value> </Rate>
            </RateList>
        </Transaction>
    </TransactionList>
</Body>
```

Similar to the pricing and trade request messages and responses discussed above, the process of retrieving trade information involves a simple exchange of messages, preferably in XML format. To receive trade blotter data a "BlotterRequest" is sent to the trading interface server. The server forwards the request to the financial service provider, receives the returned data, and sends a BlotterResponse message to the requestor. A sample BlotterRequest message is shown below:

```
<Message type="Normal">
    <Header>
        ... header info ...
    </Header>
    <Body>
        <blotter:BlotterMessage>
            <blotter:BlotterRequest
                blotter:data_start_time="978325200"
blotter:data_end_time="1001390400" blotter:mode="self">
```

-continued

```
            </blotter:BlotterRequest>
        </blotter:BlotterMessage>
    </Body>
</Message>
```

In the sample BlotterRequest message, data_start_time, data_end_time and mode are query parameters that specify the start and end times of the period for which data is to retrieved. The mode field can be used to identify the party or parties for which transaction data should be retrieved, such as a1" data for a client or data for only those trades performed by the particular user header, etc.

In response to receipt of a BlotterRequest message, and after the appropriate data is provided by the financial service provider, trading interface server issues a response containing the retrieved data. A portion of a sample response with this configuration is shown below:

```
<Body>
    <blotter:BlotterMessage>
        <blotter:BlotterResponse blotter:count="13">
            <blotter:BlotterElement blotter:allocated="0"
                blotter:amount="1000000"
                blotter:buysell_indicator="Buy"
                blotter: company="Internal" blotter:cross="USD/EUR"
                blotter:level="0.8923" blotter:quantity_ccy="EUR"
                blotter:quote_Id="D2750053"
                blotter:security_type="Spot"
                blotter:settle_date="27Mar01"
                blotter:trade_string="bought 1MM EUR vs USD @ 0.8923 on 27Mar01"
                blotter:trade_time="985369542" blotter:user="fxuser"/>
            <blotter:BlotterElement blotter:allocated="0"
                ... />
            <blotter:BlotterElement blotter:allocated="0"
                ... />
        </blotter:BlotterResponse>
    </blotter:BlotterMessage>
</Body>
```

The BlotterResponse message contains a list of elements, each of which contains a single transaction. Preferably, blotter response fields include a unique prefix (such as "blotter") to allow them to be easily distinguished from transaction related messages and the details for individual transactions are contained within discrete tags, such as start and end "BlotterElement" tags. In the sample shown above, each of the <blotter:BlotterElement> elements contains a number of fields that describe the details of a single trade.

The various aspects of the invention have been described above with reference to the preferred embodiments thereof. However, variations in the form and details can be made without departing from the spirit and scope of the invention.

TABLE 1

XML Data Type Definition
<!ELEMENT Message (Header, Body)>
<!ATTLIST Message
    type (Normal | Admin | Diagnostic) #REQUIRED
>
<!ELEMENT Header (NodeInfo+, SendDateTimeGMT?)>
<!ELEMENT NodeInfo (EntityName, Contact, User, SystemName?, Address?, HostAddress?, MessageId?)>
<!ATTLIST NodeInfo
    role (Requester | Responder) #REQUIRED
>
<!ELEMENT EntityName (#PCDATA)>
<!ELEMENT SystemName (#PCDATA)>
<!ELEMENT Address (#PCDATA)>

TABLE 1-continued

```
<!ELEMENT Contact (#PCDATA)>
<!ELEMENT User (#PCDATA)>
<!ELEMENT MessageId (#PCDATA)>
<!ELEMENT HostAddress (#PCDATA)>
<!ELEMENT SendDateTimeGMT (#PCDATA)>
<!ELEMENT Body (TransactionList)>
<!ELEMENT TransactionList (Transaction+)>
<!ATTLIST TransactionList
    type (PriceReq | PriceRes | TradeReq | TradeRes | TradeAck | TradeNak | Order | Admin | RateReq |
RateRes) #REQUIRED
    style (AtBestFX | MarketFX | LimitFX | StopFX | TwoWay) #IMPLIED
>
<!ELEMENT Transaction (TransactionStatus?, GSTransId?, QuoteExpiration?, ClientTransId?,
ProductDetail?, TimeoutInterval?, RateList?)>
<!ATTLIST Transaction
    action (New | Update | Cancel | Admin | Ignore) #REQUIRED
    ClientTradeType (Buy | Sell ) #IMPLIED
>
<!ELEMENT TransactionStatus (Accepted?, Rejected?)>
<!ATTLIST TransactionStatus
    type (Accepted | Rejected) #REQUIRED
>
<!ELEMENT Accepted (#PCDATA)>
<!ELEMENT Rejected (#PCDATA)>
<!ELEMENT TimeoutInterval (#PCDATA)>
<!ELEMENT Text (#PCDATA)>
<!ELEMENT Code (#PCDATA)>
<!ELEMENT ClientTransId (#PCDATA)>
<!ELEMENT GSTransId (#PCDATA)>
<!ATTLIST GSTransId
    type (QuoteId | TradeId) #REQUIRED
>
<!ELEMENT QuoteExpiration (#PCDATA)>
<!ELEMENT TradeTimeGMT (#PCDATA)>
<!ATTLIST TradeTimeGMT
    format CDATA #REQUIRED
>
<!ELEMENT RateList (Rate*)>
<!ATTLIST RateList
    type (ExchangeRate) #REQUIRED
    mode (Realtime | Eod) #IMPLIED
>
<!ELEMENT ProductDetail (FXSpot*, FXFoward*, FXOption?, FXSwap?)>
<!ATTLIST ProductDetail
    type (FXSpot | FXForward | FXSwap | FXOption | MoneyLoan) #REQUIRED
>
<!ELEMENT FXOption (CommodQuantity+, Rate?, Date+, OptionType+, Strike+, SettlementType?,
SettlementCurrency?)>
<!ATTLIST FXOption
    type (Put | Call) #REQUIRED
    style (Euro | Amer) #REQUIRED
>
<!ELEMENT FXForward (CommodQuantity+, Rate*, Date?, SettlementType?, SettlementCurrency?)>
<!ATTLIST FXForward
    type (FXLeg1 | FXLeg2) #IMPLIED
>
<!ELEMENT FXSwap (CommodQuantity+, Rate?, Date?, SettlementType?, SettlementCurrency?)>
<!ATTLIST FXSwap
    type (FXLeg1 | FXLeg2 ) #IMPLIED
>
<!ELEMENT FXSpot (CommodQuantity+, Rate?, Date?, SettlementType?, SettlementCurrency?)>
<!ATTLIST FXSpot
    type (FXLeg1 | FXLeg2) #IMPLIED
>
<!ELEMENT CommodQuantity (Commodity, Quantity?, Buyer?, Seller?, Date?)>
<!ATTLIST CommodQuantity
    type (QuantityCcy | OtherCcy | Premium | FlowCcy) #REQUIRED
>
<!ELEMENT Commodity (#PCDATA)>
<!ELEMENT Quantity (#PCDATA)>
<!ELEMENT Buyer (#PCDATA)>
<!ELEMENT Seller (#PCDATA)>
<!ELEMENT Date (#PCDATA)>
<!ATTLIST Date
    type (SettleDate | ValueDate | ExpirationDate | EndDate | TradeDate) #REQUIRED
    Location (NYC | LDN | HKG | TKY) #IMPLIED
>
<!ELEMENT Rate (Cross, Value*, Date?, Points*)>
<!ATTLIST Rate
    type (ExchangeRate | PremiumRate | VolatilityRate | ReferenceRate | Strike | Level) #IMPLIED
```

TABLE 1-continued

```
>
<!ELEMENT Cross (#PCDATA)>
<!ELEMENT Value (#PCDATA)>
<!ATTLIST Value
    side (Bid | Ask) #IMPLIED
>
<!ELEMENT Points (#PCDATA)>
<!ATTLIST Points
    side (Bid | Ask) #IMPLIED
>
<!ELEMENT SettlementType (#PCDATA)>
<!ELEMENT SettlementCurrency (#PCDATA)>
<!ELEMENT OptionType (#PCDATA)>
<!ELEMENT Strike (#PCDATA)>
```

What is claimed is:

1. A trading interface server configured to provide one or more investor clients access to a financial service provider, the trading interface server comprising:
   a memory;
   one or more processors; and
   computer-readable instructions that, when executed by the one or more processors, cause the trading interface server to:
      process a price request message received at the trading interface server via a stateless communications network from one of the one or more investor clients to extract data from the price request message, wherein the price request message is implemented in a messaging protocol that defines a plurality of hierarchical data types, and wherein the price request message includes a header data type having a header sub data type identifying the investor client and a body data type having a first plurality of body sub data types including sub data types indicating a first transaction type, details regarding a proposed transaction, and a price request for entering into the transaction;
      wherein extracting the data includes extracting the first transaction type from the price request message using the first plurality of body sub data types;
      identify the price request message based on the first transaction type and determine a price request interface server sub-module for processing the price request message;
      transmit the extracted data from the price request interface server sub-module to the financial service provider over a system interface, wherein the financial service provider is associated with the investor client and the system interface directs the processed price request message to a first associated financial service provider subsystem dedicated to processing price requests;
      process a price received at the trading interface server from the financial service provider over the system interface to create a price response message implemented in the messaging protocol, wherein the price response message has a header data type and a body data type having a second plurality of body sub data types indicating the transaction type, that the price request was accepted, a price for the transaction, and a transaction ID;
      transmit the price response message to the investor client via the stateless communications network;
      process a trade request message received from the investor client implemented in the messaging protocol to extract data from the trade request message, wherein the trade request message includes a header data type and a body data type, the body data type having a second plurality of body sub data types including sub data type indicating a second transaction type and the transaction ID;
      wherein extracting the data includes extracting the second transaction type from the trade request message using the second plurality of body sub data types;
      identify the trade request message based on the second transaction type and determine a trade request interface server sub-module for processing the trade request message;
      transmit the extracted data from the trade request interface server sub-module to the financial service provider over the system interface, wherein the system interface directs the processed trade request message to a second associated financial service provider subsystem dedicated to processing trade requests;
      obtain approval to enter into the transaction from the financial service provider;
      upon receiving approval, transmit a trade response message implemented in the messaging protocol to the investor client via the stateless communications network, the trade response message including header data type and a body data type, the body data type having a third plurality of body sub data types including sub data types indicating the transaction ID and that the trade request was approved;
      receive a trade acknowledgement message implemented in the messaging protocol from the investor client via the stateless communications network, the trade acknowledgement message including a header data type and a body data type, the body data type having a fourth plurality of body sub data types including a sub data types indicating the transaction ID; and
      upon receipt of the trade acknowledgement message, indicating to the financial service provider to book the transaction associated with the transaction ID.

2. The trading interface server of claim 1, wherein the computer-readable instructions, when executed by the one or more processors, further cause the trading interface server to:
   transmit a price response message to the investor client responsive to the trading interface server receiving notice from the financial service provider of a failure to price the transaction, wherein the price response message is implemented in the messaging protocol and indicates that the price request was rejected.

3. The trading interface server of claim 2, wherein the price response message further indicates a reason the price request was rejected.

4. The trading interface server of claim 1, wherein the computer-readable instructions, when executed by the one or more processors, further cause the trading interface server to:
transmit a second trade response message to the investor client responsive to the trading interface server receiving notice from the financial service provider of a failure to approve a transaction request, wherein the trade response message is implemented in the messaging protocol and indicates that the trade request was rejected.

5. The trading interface server of claim 4, wherein the second trade response message further indicates a reason the transaction was rejected.

6. The trading interface server of claim 1, wherein the computer-readable instructions, when executed by the one or more processors, further cause the trading interface server to:
signal an error condition indicating that a party at the investor client should be contacted in response to the trading interface server failing to receive a trade acknowledgement message from the investor client within a specified period of time following transmission of the approved trade response message.

7. The trading interface server of claim 6, wherein the data in the header data type of the price request message includes a plurality of header sub data types indicating a name of the investor client and a contact at the investor client associated with the transaction being priced, and wherein the computer-readable instructions, when executed by the one or more processors, further cause the trading interface server to indicate that the specified contact at the investor client should be contacted when the error condition occurs.

8. The trading interface server of claim 1, wherein the computer-readable instructions, when executed by the one or more processors, further cause the trading interface server to:
process a rate request message received at the trading interface server via the stateless communications network from the investor client, wherein the rate request message includes a header data type indicating the investor client and a body data type indicating a currency exchange cross;
obtain an exchange rate for the currency exchange cross from the financial service provider; and
transmit a rate response message to the investor client, the rate response message including a header data type and a body data type, the body data type indicating including a plurality of body sub data types indicating the currency exchange cross and the exchange rate.

9. The trading interface server of claim 1, wherein the computer-readable instructions, when executed by the one or more processors, further cause the trading interface server to:
receive a trade blotter request message from the investor client via the network, the blotter request message including a header data type indicating the investor client and a body data type including a plurality of body sub data types indicating start and end times and at least one party for which blotter data is requested;
obtain, from the financial service provider, trade data for the identified party between the start and end times; and
transmit a blotter response message to the investor client, the blotter response message having a header data type and a body data type indicating the data obtained from the financial service provider.

10. The trading interface server of claim 1, wherein the messaging protocol is compatible with an XML format.

11. A method performed at a computing device for providing an entity access to a financial service provider, the method comprising:
receiving, by the computing device, a price request message from the entity via a stateless communications network, wherein the price request message is implemented in a messaging protocol that defines a plurality of hierarchical data types, and wherein the price request message includes a header data type identifying the entity and a body data type having a first plurality of body sub data types identifying a transaction type, details regarding a proposed transaction, and a price request for entering into the transaction;
identifying the transaction type data from the first plurality of body sub data types to determine a price request interface server sub-module for processing the price request message;
transmitting data extracted from the price request message including the identified transaction type to a financial service provider sub-system dedicated to processing price requests;
receiving a price from the financial service provider;
creating, by the computing device, a price response message implemented in the messaging protocol, the price response message having a header data type and a body data type including a second plurality of body sub data types indicating the transaction type, indication that the price request was accepted, a price for the transaction, and a transaction ID;
transmitting the price response message to the entity via the stateless communications network;
receiving, by the computing device, a trade request message from the entity, the trade request message having a header data type and a body data type indicating the transaction ID;
receiving from the financial service provider approval to enter into the transaction;
responsive to receiving the approval, transmitting, by the computing device, a trade response message to the entity, the trade response message having a header data type and a body data type including a second plurality of body sub data types indicating the transaction ID and that the trade request was approved;
receiving, by the computing device, a trade acknowledgement message from the entity, the trade acknowledgement message having a header data type and a body data type, the body data type indicating the transaction ID; and
sending, by the computing device, an indication to the financial service provider to execute the transaction associated with the transaction ID.

12. The method of claim 11, further comprising:
receiving, by the computing device, an indication from the financial service provider that a price request has been rejected; and
responsively transmitting, by the computing device, a price response message to the entity indicating that the price request was rejected.

13. The method of claim 11, further comprising:
receiving, by the computing device, an indication from the financial service provider that a transaction request has been rejected; and
responsively transmitting, by the computing device, a trade response message to the entity indicating that the trade request was rejected.

14. The method of claim 13, wherein the trade response message further indicates a reason the transaction was rejected.

15. The method of claim 11, wherein the third plurality of body sub data types further indicate contains a quote expiration data specifying a period of time during which the approved price is valid.

16. The method of claim 11, further comprising:
in response to a failure to receive a trade acknowledgement message from the entity within a specified period of time following transmission of the approved trade response message, signaling, by the computing device, an error condition indicating that a party at the entity should be contacted.

17. The method of claim 11, wherein data in the body data types of each of: the price request message, the price response message, the trade request message, and the trade response message further includes a client transaction ID specified by the entity.

18. The method of claim 11, wherein the body data type of the trade request message further indicates trade allocation instructions.

19. The method of claim 11, further comprising:
receiving, by the computing device, a rate request message from the entity, the rate request message having a header data type indicating the entity and a body data type indicating a currency exchange cross;
receiving, by the computing device, an exchange rate for the currency exchange cross from the financial service provider; and
transmitting, by the computing device, a rate response message to the entity, the rate response message having a header data type and a body data type indicating the currency exchange cross and the exchange rate.

20. The method of claim 11, further comprising:
receiving, by the computing device, a trade blotter request message from the entity via the stateless communications network, the blotter request message having a header data type indicating the entity and a body data type indicating start and end times and at least one party for which blotter data is requested;
receiving, by the computing device, from the financial service provider trade data for the identified party between the start and end times; and
transmitting, by the computing device, a blotter response message to the entity, the blotter response message having a header data type and a body data type, the body data type indicating data received from the financial service provider.

* * * * *